US008643861B2

(12) United States Patent
Takeishi (10) Patent No.: US 8,643,861 B2
(45) Date of Patent: Feb. 4, 2014

(54) IMAGE PROCESSING APPARATUS, DATA PROCESSING METHOD OF IMAGE PROCESSING APPARATUS, AND STORAGE MEDIUM FOR PERFORMING MULTITASK PROCESSING AND SINGLE TASK PROCESSING WHILE INTERPRETING PDL DATA (75) Inventor: Hiroki Takeishi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 13/430,537

(22) Filed: Mar. 26, 2012

(65) Prior Publication Data

US 2012/0250056 A1    Oct. 4, 2012

(30) Foreign Application Priority Data

Mar. 31, 2011 (JP) ................................. 2011-079422

(51) Int. Cl.
*G06F 3/12* (2006.01)
(52) U.S. Cl.
USPC ......................... 358/1.13; 358/1.15; 358/1.16
(58) Field of Classification Search
None
See application file for complete search history.

(56) References Cited

U.S. PATENT DOCUMENTS 5,781,711 A * 7/1998 Austin et al. ................. 358/1.15
6,292,267 B1 * 9/2001 Mori et al. ................... 358/1.15
6,525,831 B1 * 2/2003 Evans, IV .................... 358/1.15
7,068,383 B1 * 6/2006 Bello et al. ................... 358/1.15

FOREIGN PATENT DOCUMENTS

JP         8-297560 A    11/1996
JP       2004-268553 A    9/2004

* cited by examiner

*Primary Examiner* — Miya J Cato
(74) *Attorney, Agent, or Firm* — Canon USA, Inc., IP Division (57) ABSTRACT An image processing apparatus includes a determination unit configured to determine whether a predetermined communication protocol is a type of communication protocol that requires a response to an inquiry command, and a control unit configured not to switch a multitask mode setting if the determination unit determines that the predetermined communication protocol is not a type that requires a response, and to switch, if the determination unit determines that the predetermined communication protocol is a type that requires a response, a multitasking mode setting on the interpretation unit to a single-tasking mode setting to cause the interpretation unit to interpret PDL data by performing single-task processing.

7 Claims, 10 Drawing Sheets

```
%!PS-Adobe-3.0 Query  ~1000-3-0
%%?BeginFontListQuery  ~1000-3-1
%%?EndFontListQuery: Unknown  ~1000-3-2
%%?BeginFeatureQuery:*PSVersion  ~1000-3-3
%%?EndFeatureQuery: Unknown
%%?BeginQuery:ADOSpooler
%%?EndQuery:spooler
%%EOF  ~1000-3-4
```

FIG. 5

%!PS-Adobe-3.0 Query ~1000-3-5
%%?BeginFeatureQuery: *Product~1000-3-6
statusdict begin
("\()print product print(\)" \n)print  ⎫
end                                     ⎬ ~1000-3-7
%%?EndFeatureQuery: Unknown ~1000-3-8
%%EOF ~1000-3-9

IMAGE PROCESSING APPARATUS, DATA PROCESSING METHOD OF IMAGE PROCESSING APPARATUS, AND STORAGE MEDIUM FOR PERFORMING MULTITASK PROCESSING AND SINGLE TASK PROCESSING WHILE INTERPRETING PDL DATA

BACKGROUND OF THE INVENTION

1. Field of the Invention

The present invention relates to an image processing apparatus capable of performing parallel processing with respect to print information using a multitasking function, a data processing method of the image processing apparatus, and a storage medium.

2. Description of the Related Art

The present invention relates to an image processing apparatus capable of performing parallel processing with respect to print information using a multitasking function, a data processing method of the image processing apparatus, and a program.

Recently, along with an improvement in processor technology, there has been an image processing apparatus which processes page description language (PDL) data at high-speed using multitask processing.

A conventional image processing system which interprets the PDL data and generates image formation bitmap data performs a process as described below. In general, in such an image forming process, the system interprets the PDL data, performs graphics processing, and generates intermediate data referred to as a display list (DL). The system then performs rendering, i.e., generates the image formation bitmap data using the intermediate data (refer to Japanese Patent Application Laid-Open No. 2004-268553).

Further, a control unit referred to as a master process divides a PDL data stream into two so that the PDL data operates in parallel. Sub-processes which are executed by two tasks then interpret the PDL data (refer to Japanese Patent Application Laid-Open No. 8-297560). The image processing apparatus thus performs parallel processing to interpret the PDL data, so that performance of PDL interpretation can be improved.

Furthermore, there is a technique in which an image processing apparatus realizes high-speed PDL interpretation by interpreting one piece of PDL data in parallel in a plurality of tasks. More specifically, the image processing apparatus divides the PDL data by a page, and distributes each of a plurality of the divided pages to each of a plurality of tasks. As a result of such division processing, the image processing apparatus can perform PDL interpretation in parallel using a plurality of resources such as a central processing unit (CPU) in the image forming processing apparatus. Usage efficiency of resources in the image forming processing apparatus is thus improved, and PDL interpretation can be performed at higher speed.

Communication between the image processing apparatus and a host apparatus is described below. Conventionally, data communication from a data processing apparatus on the host-side included in the image processing system depends on an operating system (OS). Currently, the system is created by utilizing a Windows® OS or a MacOS installed in the data processing apparatus.

In such a system environment, a first data processing apparatus corresponding to the Windows® system communicates with the image processing apparatus using a communication protocol such as transmission control protocol/Internet protocol (TCP/IP) as a data communication protocol. Further, a second data processing apparatus in the MacOS system communicates using a communication protocol such as AppleTalk®. The first and second data processing apparatuses communicate with the image processing apparatus as described below in performing printing using print information based on PDL, such as PostScript (PS (registered trademark)) as the print data.

For example, the first data processing apparatus transmits the print information based on PS to the image processing apparatus by one-way communication, and the image processing apparatus does not perform response processing. On the other hand, the second data processing apparatus transmits to the image processing apparatus the print information based on PS (i.e., PDL data) by bidirectional communication, and may receive a response from the image processing apparatus.

SUMMARY OF THE INVENTION

According to an aspect of the present invention, an image processing apparatus includes a receiving unit configured to receive PDL data from a data processing apparatus according to a predetermined protocol, an interpretation unit configured to interpret PDL data received by the receiving unit by performing multitask processing when a multitasking mode is set, and by performing single-task processing when a single-tasking mode is set, a determination unit configured to determine whether the predetermined communication protocol is a type of communication protocol that requires a response to an inquiry command, and a control unit configured not to switch, if the determination unit determines that the predetermined communication protocol is not a type that requires a response, a multitask mode setting, and configured to switch, if the determination unit determines that the predetermined communication protocol is a type that requires a response, a multitasking mode setting on the interpretation unit to a single-tasking mode setting to cause the interpretation unit to interpret PDL data by performing single-task processing.

Further features and aspects of the present invention will become apparent from the following detailed description of exemplary embodiments with reference to the attached renderings.

BRIEF DESCRIPTION OF THE RENDERINGS

The accompanying renderings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

As described above, in a printing system, the second data processing apparatus which performs bidirectional communication transmits print information based on PS (i.e., PDL data) to the image processing apparatus. If the image processing apparatus in the printing system performs multitask processing in interpreting the PDL data which requires bidirectional communication to be performed with the second data processing apparatus, a communication error is generated therein.

More specifically, when the image processing apparatus performs multitask processing with respect to the PDL data, a plurality of tasks is executed for interpreting the PDL data, so that a plurality of PDL data interpretation results is acquired in the image processing apparatus. As a result, when the image processing apparatus performs PDL interpretation in which it is necessary to perform bidirectional communication, a plurality of communication processing may be generated with respect to one piece of PDL data. In such a case, as described below, a host side can experience difficulties in performing such plurality of communication processing.

The host side receives a plurality of responses in communication with respect to PDL data processing in the above-described case, so that a communication error occurs in the host side. In other words, since the second data processing apparatus acquires from the image processing apparatus an expected response on an inquiry using the PS (registered trademark), the second data processing apparatus downloads to the image processing apparatus, resources such as a font file. If the second data processing apparatus downloads the resources such as the font file to the image processing apparatus when performing conventional multitask processing and PDL interpretation in which bidirectional communication becomes necessary, the communication error occurs.

The cause of the communication error is as follows. The image processing apparatus interprets the PDL data by performing parallel processing, i.e., multitask processing, so that two data interpretation results are acquired in parallel. As a result, the image processing apparatus may generate a plurality of communication processing with respect to one piece of PDL data when performing PDL interpretation in which bidirectional communication becomes necessary. If such a plurality of communication processing is generated between the data processing apparatus on the host side and the image processing apparatus, the data processing apparatus receives a plurality of responses with respect to one communication. The communication error thus occurs in the data processing apparatus.

The present invention is directed to solving the above-described problem. More specifically, the present invention is directed to providing a method for determining an operation mode in which the image processing apparatus becomes capable of normally responding to the data processing apparatus while interpreting the PDL data, by adapting to communication between the data processing apparatus from which the PDL data is received.

Exemplary embodiments of the present invention will be described below with reference to the renderings.

Figure 1:
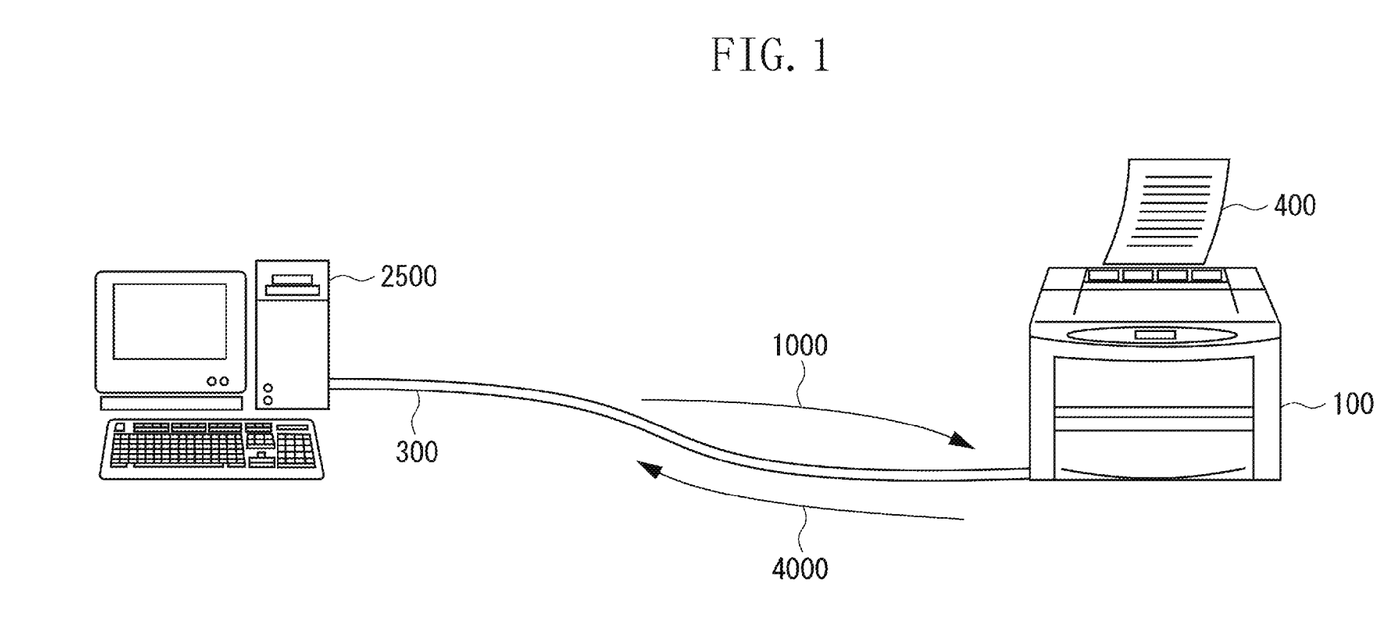
FIG. 1 illustrates an example of an image processing system.

FIG. 1 illustrates an example of an image processing system according to a first exemplary embodiment. According to the present exemplary embodiment, the system includes the data processing apparatus connected to the image processing apparatus to be capable of performing bidirectional communication via a network. A printer apparatus which receives predetermined PDL data is illustrated as an example of the image processing apparatus. According to the present exemplary embodiment, the PDL data conforming to PS is assumed to be the predetermined PDL data.

Referring to FIG. 1, a data processing apparatus 2500 (i.e., a personal computer (PC)) performs data processing for generating PDL data 1000 by executing an application, middleware, and driver software. The PC 2500 and a printer 100 are connected to each other by a communication unit such as a network 300. The printer 100 thus uses the PDL data 1000 acquired via the network 300 and forms a visible image on a visible medium such as a sheet 400.

According to the present exemplary embodiment, it is assumed that the PC 2500 is a personal computer. However, the present invention may be implemented by any type of apparatus capable of generating and transferring the PDL data 1000 or image data corresponding thereto. In other words, the present invention may be implemented by a work station, a main frame computer, a smartphone, a digital camera, etc.

Further, according to the present exemplary embodiment, the printer is described as an example of the image processing apparatus. However, the present invention is not limited to a printer, and may be implemented using any apparatus capable of forming a visual image, e.g., a multifunction peripheral (MFP), a printing device, a display apparatus, etc.

Figure 6:
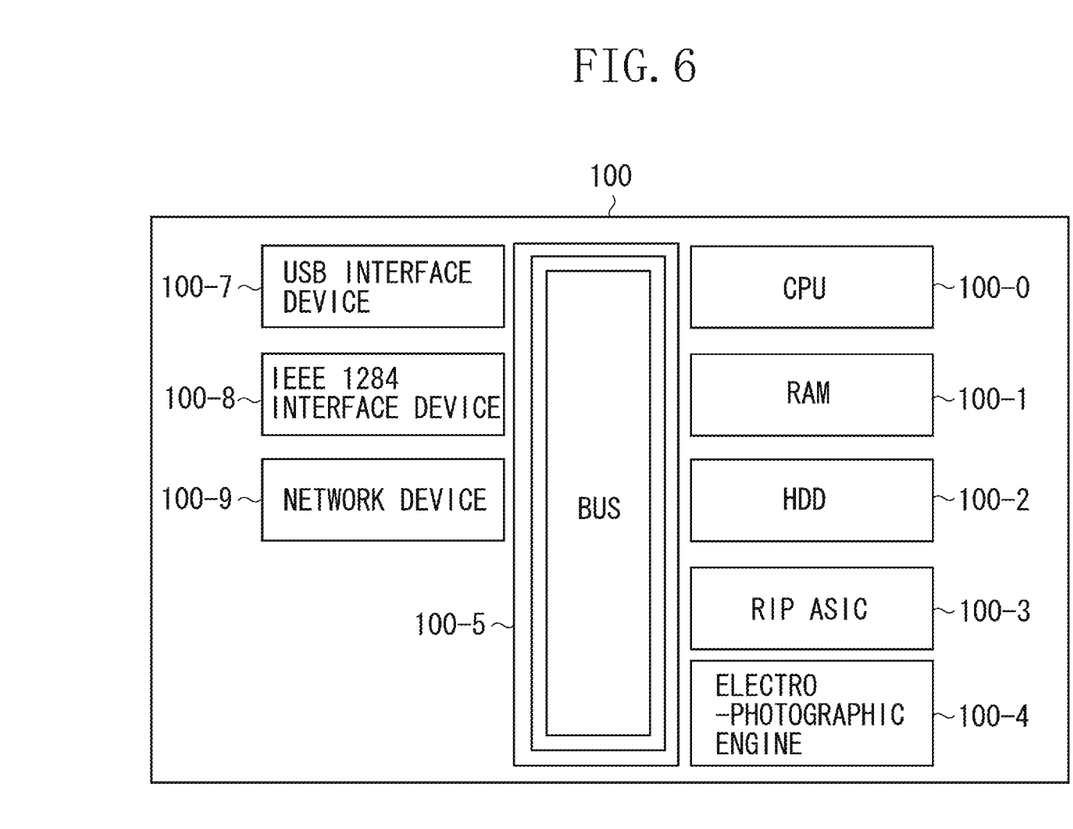
FIG. 6 is a block diagram illustrating a configuration of the image processing apparatus.

A connection technology and the communication unit between the PC 2500 and the printer 100 will be described below with reference to FIG. 1. According to the present exemplary embodiment, the PC 2500 and the printer 100 in the image processing system are connected via the network such as Ethernet® by which bidirectional communication can be performed. The present invention may also be implemented using an interface device by which bidirectional communication can be performed, such as a universal serial bus (USB) interface 100-7 and Institute of Electrical and Electronics Engineers (IEEE) 1284 interface apparatus 100-8 as illustrated in FIG. 6, which is described below.

A communication method using the PDL data 1000, and in particular, PS®-based PDL data, via the connection technology is described below. The PC 2500 transmits to the printer 100 via the network 300 the PDL data 1000.

More specifically, according to the present exemplary embodiment, the PC 2500 conforms to a Portable Operating System Interface (POSIX®) standard, so that the PC 2500 can transmit the PDL data 1000 to the printer 100 by executing a command as described below. For example, if the PC 2500 is to transmit a file "test.ps" to the printer connected to a device "lp0", the PC 2500 executes the command as follows.

[foo@test-ws~]$cat/home/foo/test.ps>/dev/lp0

The PC 2500 transmits the PDL data 1000 to the printer 100 via the network 300. Upon receiving the PDL data 1000, the printer 100 processes the PDL data 1000 and forms the visual image on the sheet 400.

Further, the printer 100 receives and processes the PDL data 1000, and may then transmit a response 4000 to the host. The printer 100 transmits the response 4000 to respond to an inquiry from the host using the PDL data 1000. A simple example of response processing is described below. The PC 2500 may transmit to the printer 100 an inquiry as follows using the PDL data 1000 which conforms to the PS® standard.

/XXXXXX-Font/Font resource status==clear

The above-described PDL data 1000 is a command for inquiring whether a font resource file "XXXXXX-Font" exists in the printer 100. The printer 100 receiving such PDL data 1000 interprets the PDL data 1000 and confirms whether the font resource file exists in the printer 100. If the font resource file exists, the printer 100 responds by transmitting data "true" as the response 4000 to the PC 2500. On the other hand, if the font resource file does not exist in the printer 100, the printer 100 responds by transmitting data "false" as the response 4000 to the PC 2500.

As described above, according to the present exemplary embodiment, the printer 100 and the PC 2500 are capable of interpreting the PDL data by performing bidirectional communication. Further, according to the present exemplary embodiment, the PC 2500 conforms to POSIX® standard. However, the present embodiment may be implemented by a computer conforming to another standard as long as the PC 2500 is a computer which realizes multitask processing and bidirectional communication.

Figure 2:
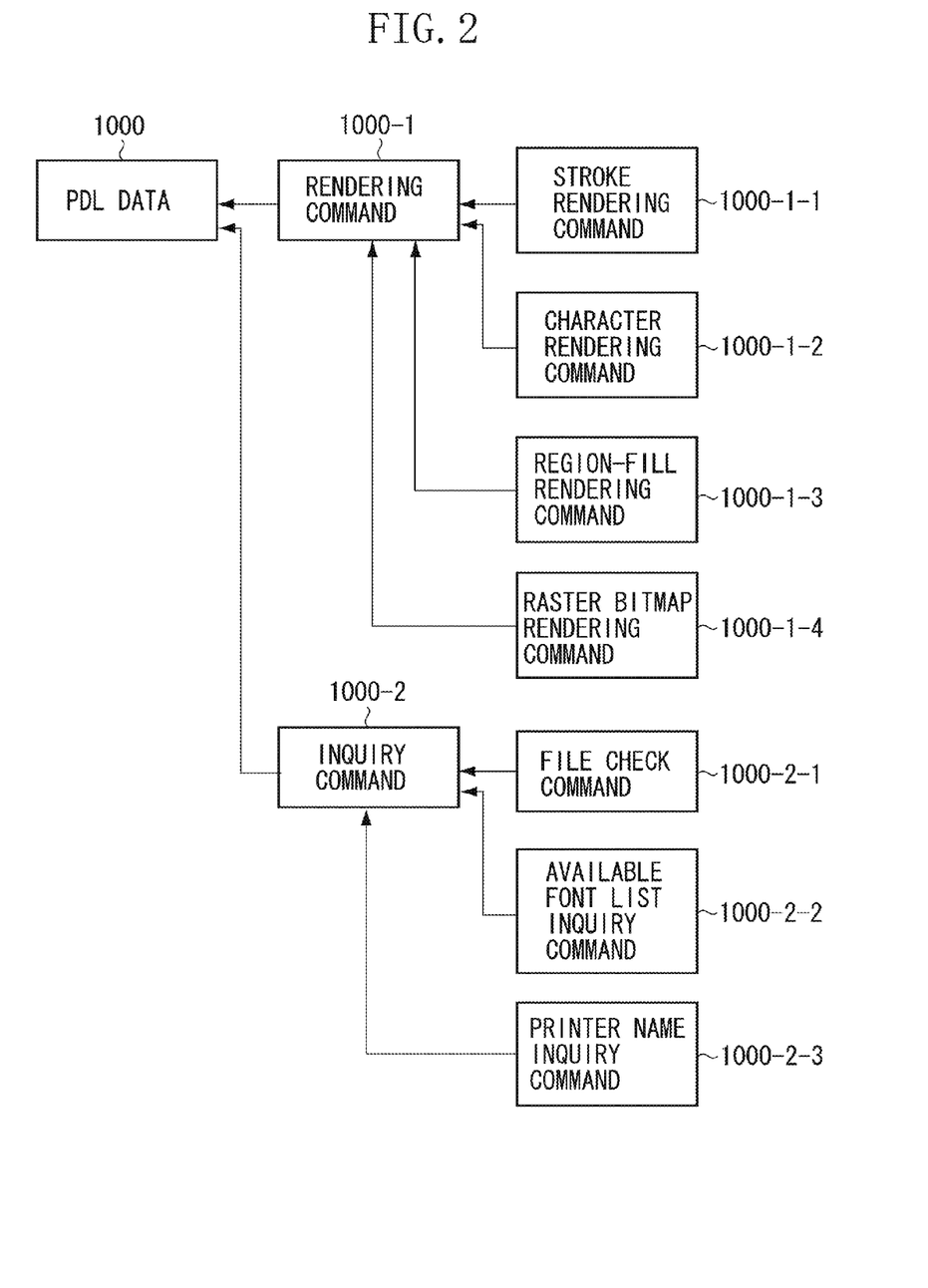
FIG. 2 illustrates a structure of the PDL data processed by the image processing apparatus.

FIG. 2 illustrates the structure of the PDL data 1000 processed by the image processing apparatus illustrated in FIG. 1.

Referring to FIG. 2, the PDL data 1000 according to the present exemplary embodiment has a data structure employing the PS® technique. In other words, the PDL data 1000 can include at least a rendering command 1000-1 and an inquiry command 1000-2. Further, the rendering command 1000-1 can include a stroke character command 1000-1-1 and a character rendering command 1000-1-2. Furthermore, the rendering command 1000-1 can include a region fill rendering command 1000-1-3 and a raster bitmap rendering command 1000-1-4.

The inquiry command 1000-2 can include a file check command 1000-2-1 and an available font list inquiry command 1000-2-2. Further, the inquiry command can include a printer name inquiry command 1000-2-3. The present embodiment may also be implemented if the PDL data 1000 is capable of including other rendering command 1000-1 and inquiry command 1000-2.

Figure 3:
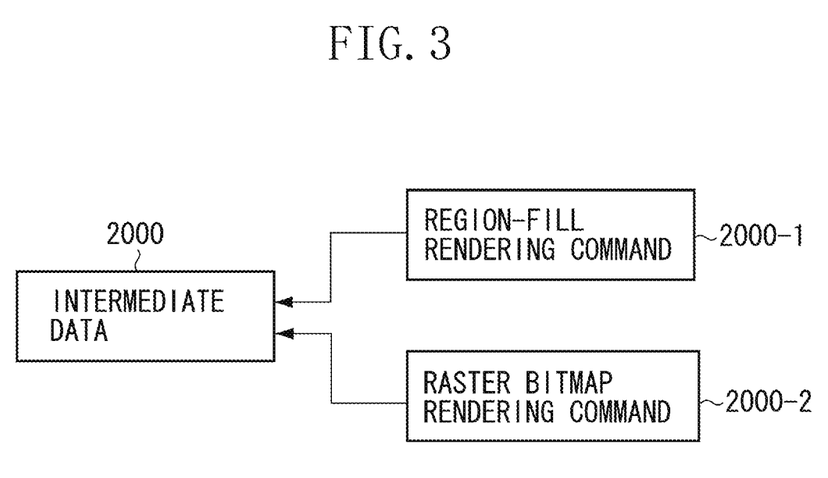
FIG. 3 illustrates a structure of the intermediate data processed by the image processing apparatus.

FIG. 3 illustrates the structure of the intermediate data 2000 processed by the image processing apparatus according to the present exemplary embodiment.

Referring to FIG. 3, the intermediate data 2000 has a data structure that can be interpreted by a raster image processor (RIP)-application specific integrated circuit (ASIC) 1000-3 in the printer 100 as illustrated in FIG. 6, which is described below. The RIP-ASIC is capable of generating image formation bitmap data by interpreting command groups 2000-1 and 2000-2 included in the intermediate data 2000 is described below. More specifically, the intermediate data 2000 can include at least a mark out rendering command 2000-1 and a raster bitmap rendering command 2000-2. The present invention may also be implemented if the intermediate data 2000 can include other rendering commands.

Examples of the inquiry command transmitted from the data processing apparatus to the image processing apparatus are described below.

Figure 4:
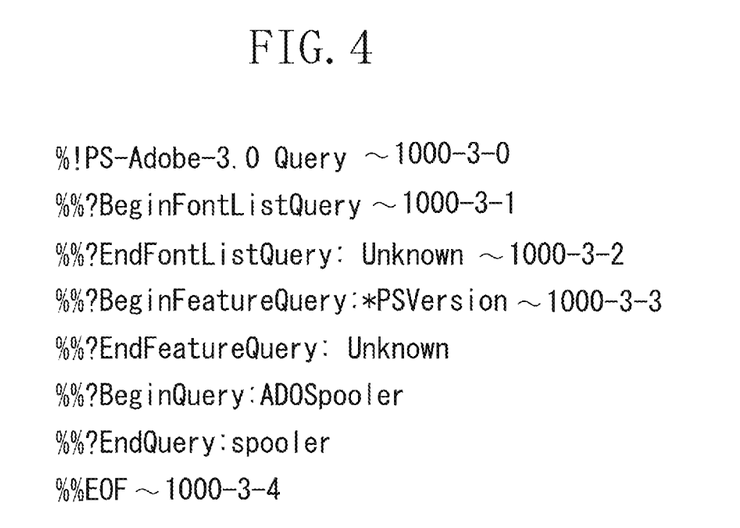
FIG. 4 illustrates an example of an inquiry command transmitted to the image processing apparatus.
Figure 5:
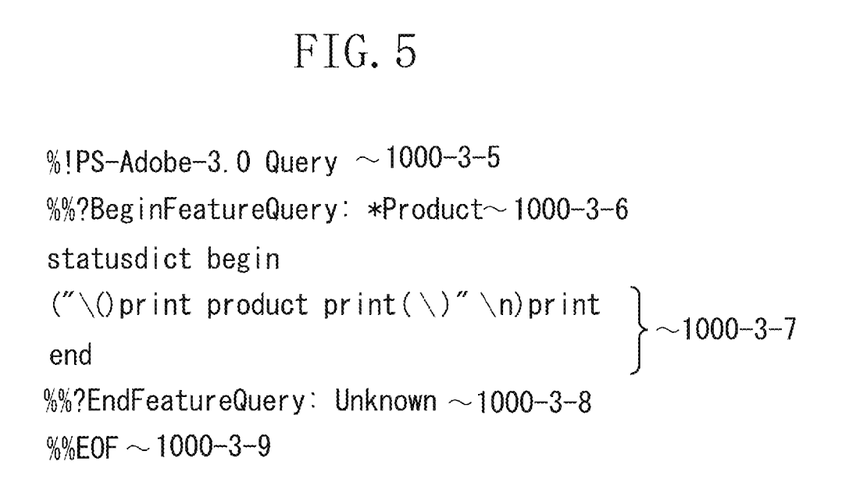
FIG. 5 illustrates an example of the inquiry command transmitted to the image processing apparatus.

FIGS. 4 and 5 illustrate examples of the inquiry command transmitted from the data processing apparatus to the image processing apparatus illustrated in FIG. 1. The inquiry command conforms to data stream compatibility (DSC) standard. According to the present exemplary embodiment, the inquiry command includes the following features:

1) An inquiry job start begins with a job recognition comment %!PS-Adobe-3.0 Query and ends with %%EOF.

2) The inquiry command is designated by two percent characters (%%) which are necessary at the beginning of the line.

3) The inquiry command begins with %%?Begin.

4) The inquiry command is formed of a text character string including 255 characters or less, followed by a code indicating an end of the line (i.e., end-of-line).

5) The code indicating the end of the line (i.e., end-of-line) is either a line field (Hex: 0D) or a carriage return (Hex: 0A).

6) The end of the inquiry command is indicated by %%End followed by one or more keywords.

7) The end of the inquiry command may be followed by a colon (:) as an option, and is set off by a series of continuous default values with respect to the inquiry.

8) If the printer 100 cannot analyze the inquiry or does not support the inquiry, the printer 100 returns the above-described default value to the data processing apparatus.

9) An inquiry job may include a plurality of inquiries.

A DSC processing unit 200-1 in the image processing apparatus illustrated in FIG. 7 as described below extracts the inquiry command according to the above-described standard. The DSC processing unit 200-1 then determines the type of the extracted inquiry command and performs DSC processing accordingly. An example of processing performed by the DSC processing unit 200-1 is described below with reference to FIG. 4.

Referring to FIG. 4, a command 1000-3-0 indicates a head of the inquiry job, followed by an inquiry comment start command 1000-3-1. In particular, the command illustrated in FIG. 4 is a command for causing the PC 2500 to inquire to the printer 100 about the font list, i.e., the list of fonts installed in the printer. Upon confirming such a command, the DSC processing unit 200-1 acquires the font file list stored in a hard disk drive (HDD) 100-2 or a random access memory (RAM) 100-1 in the image processing apparatus as illustrated in FIG. 6. The DSC processing unit 200-1 then responds via the network 300 by transmitting the font file list to the PC 2500. A subsequent inquiry comment end command 1000-3-2 forms a pair with the inquiry comment start command 1000-3-1 and clarifies a range of the inquiry comment command 1000-2.

Another example of the process performed by the DSC processing unit 200-1 is described below with reference to FIG. 5. Referring to FIG. 5, a command 1000-3-5 indicates the head of an inquiry job, followed by an inquiry comment start command 1000-3-6. In particular, the command illustrated in FIG. 5 is a command for causing the PC 2500 to inquire to the printer 100 about "product", i.e., a name of the printer 100.

A subsequent inquiry command 1000-3-8 conforms to the PS® standard. The inquiry command 1000-3-8 is the command for causing the PC 2500 to inquire to the printer 100 about "product", i.e., the name of the printer 100, similarly to the above-described command.

Figure 8:
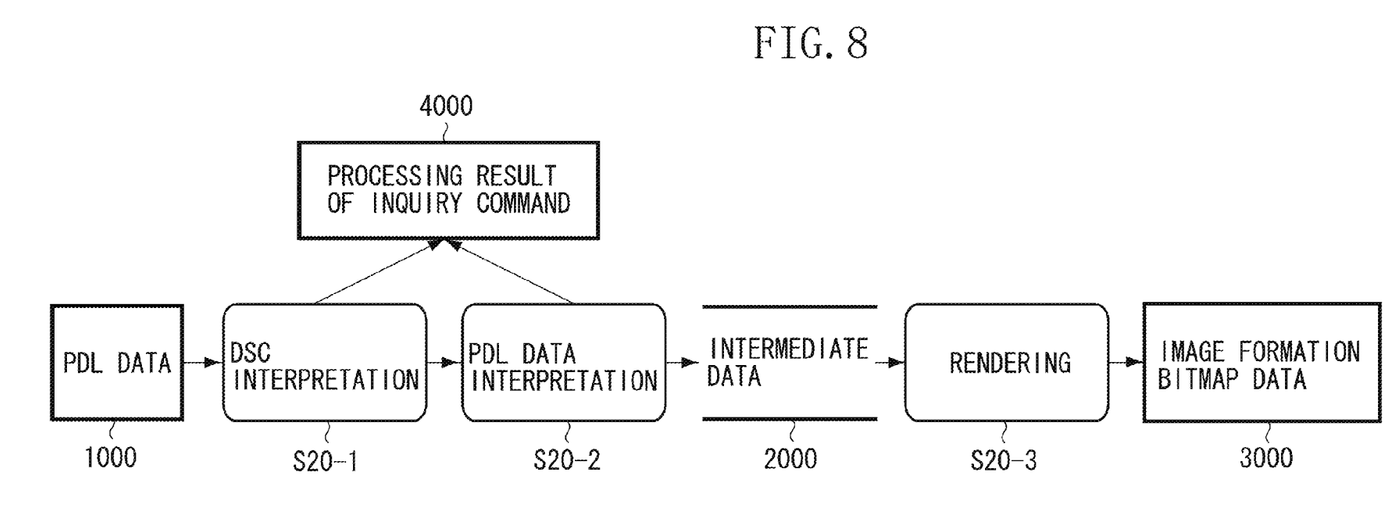
FIG. 8 is a block diagram illustrating a process of the software module in the image processing apparatus.

According to the present exemplary embodiment, if a PDL data interpretation unit 200-2 in the image processing apparatus illustrated in FIG. 8 confirms such a command, the PDL data interpretation unit 200-2 acquires the product name stored in the HDD 100-2 or the RAM 100-1. The PDL data interpretation unit 200-2 then responds via the network 300 to the PC 2500 by transmitting the acquired product name.

A subsequent command 1000-3-2 is an inquiry comment end command which forms a pair with the inquiry comment start command 1000-3-1 and clarifies a range of the inquiry comment command 1000-2.

As described above, the inquiry command according to the PS® standard may be included in the command conforming to the DSC standard. Such an inquiry command in which the data of the PS® standard is included in the DSC standard command is advantageous in that a complex inquiry command can be realized using high-level language analysis typical of PS®.

The feature of the high-level language analysis typical of PS® is as follows. The printer 100 can previously register a fixed process, i.e., a procedure, by setting a value referred to as procname and conforming to the PS® standard. Further, if the printer conforms to the PS® standard, the printer 100 becomes capable of performing language analysis using variables. There are other advantages in conforming to the PS® standard. However, since the present exemplary embodiment is not directed to describing detailed specifications of PS®, further description will be omitted.

The command group to be processed by the DSC processing unit and the commands are described below in an order in which the commands are processed.
%%?BeginFileQuery: <filename>
%%?EndFileQuery: <default>
The above-described command is for inquiring whether the designated file is available in the printer 100.
%%?BeginFontListQuery
%%?EndFontListQuery: <default>
The above-described command is for inquiring about the list of the available fonts in the printer 100.
%%?BeginFontQuery<fontname>
%%?EndFontQuery: <default>
The above-described command is for inquiring whether the designated font is available in the printer 100.
%%?BeginPrinterQuery
%%?EndPrinterQuery: <default>
The above-described command is for inquiring about the product name, a version number, and a revision number of the printer 100.

Inquiry commands other than those described above are defined as previously indicated. However, since the present exemplary embodiment is not directed to describing the detailed specification of the inquiry command, further description will be omitted. Further, the data format of the inquiry command and the exemplary embodiment of the command have been described above. However, the present embodiment may be implemented by also conforming to other standards, as long as it is a data format for transferring the inquiry command to the printer 100.

The devices included in the image processing apparatus in the printer 100 with respect to the PDL data 1000 are described below with reference to FIG. 6.

Referring to FIG. 6, the USB interface device 100-7 allows the PDL data 1000 to be externally input to the printer 100 via external devices conforming to the USB standard.

The IEEE 1284 interface device 100-8 similarly allows the PDL data 1000 to be externally input to the printer 100 external devices conforming to the IEEE 1284 standard.

A network device 100-9 similarly allows the PDL data 1000 to be externally input to the printer 100 via external devices conforming to the network standard.

The USB interface device 100-7, the IEEE 1284 interface device 100-8, and the network device 100-9 allow the printer 100 to receive the PDL data 1000 under control of a communication control unit 200-0 illustrated in FIG. 7 as described below. A central processing unit (CPU) 100-0 executes the commands stored in the RAM 100-1 and thus executes a software module 200 that realizes PDL interpretation as described below.

The RAM 100-1 is a volatile storage medium. The RAM 100-1 can store the PDL data 1000 and the commands to be executed by the CPU 100-0. Further, the RAM 100-1 can transfer to other devices including the CPU 100-0 via a bus 100-5 the PDL data 1000 and the commands to be executed by the CPU 100-0. Since the RAM 100-1 is a volatile storage medium, the commands and the data stored in the RAM 100-1 are deleted when the printer 100 is powered off.

The HDD 100-2 is a non-volatile storage medium. The HDD 100-2 stores the commands to be processed by the CPU 100-0 and the data, so that the commands and the data in the RAM 100-1 that are deleted when the power is turned off can be stored in the HDD 100-2. Further, according to the present exemplary embodiment, storage capacity of the HDD 100-2 is greater than the RAM 100-1, so that the data such as the image formation bitmap data 3000 is stored in the HDD 100-2. According to the present exemplary embodiment, the HDD 100-2 is an example of the non-volatile storage medium. However, the present embodiment may also be implemented using a flash type electrically erasable programmable read-only memory (EEPROM), a ferroelectric memory (FeRAM), a magnetoresistive memory (MRAM), etc., instead of the HDD 100-2. The RIP ASIC 100-3 receives the intermediate data as described below and is capable of generating the bitmap data 3000.

An electrophotographic engine 100-4 uses the bitmap data 3000 generated by the RIP ASIC 100-3 and generates the visible image on the visible medium, such as paper. According to the present exemplary embodiment, the visible image is formed on the visible medium using the electrophotographic engine. However, the present embodiment can also be implemented using mechanisms such as a liquid crystal panel, an organic electroluminescence (EL) panel, a typographic print engine, an offset print engine, an inkjet print engine, etc. The bus 100-5 connects the above-described devices and allows the data and the commands to be exchanged between each other.

The software module 200 which operates on the CPU 100-0 is described below with reference to FIG. 7. Software modules 200-0, 200-2, 200-3, 200-4, 200-5, and 200-6 executed by the CPU 100-0 described below may also be collectively referred to as a software module group.

Figure 7:
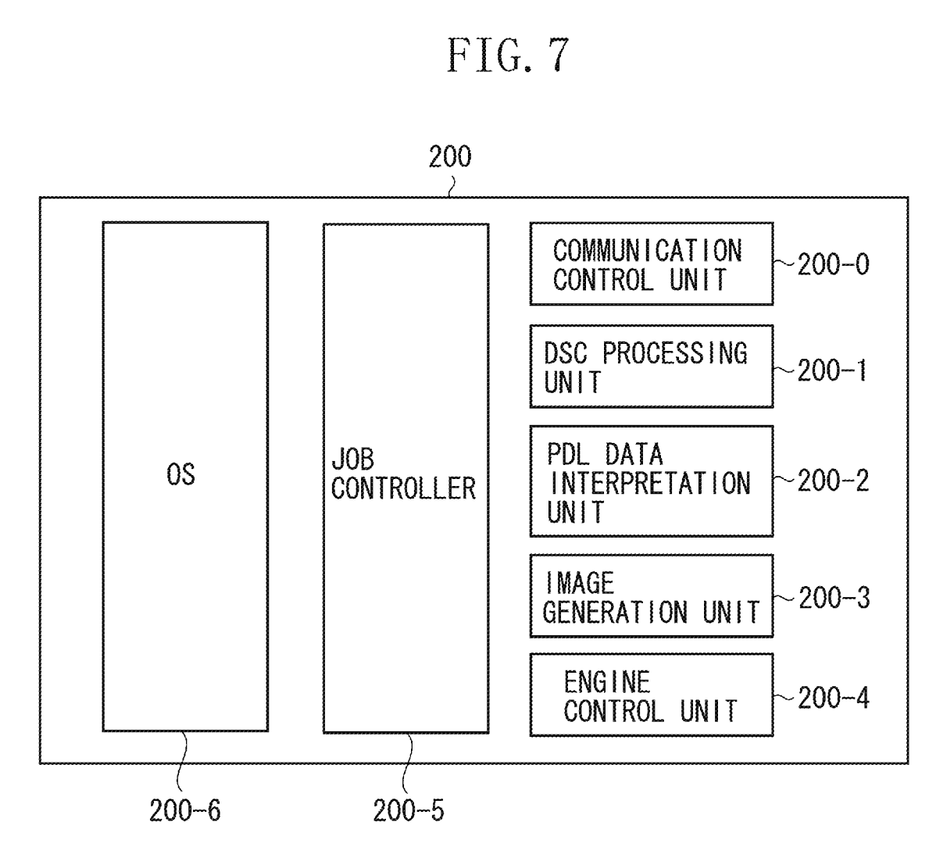
FIG. 7 is a block diagram illustrating a configuration of a software module in the image processing apparatus.

Referring to FIG. 7, a communication control unit 200-0 controls the USB-interface device 100-7, the IEEE 1284 interface device 100-8, and the network device 100-9, and establishes a communication connection with the PC 2500. Further, the communication control unit 200-0 controls the USB-interface device 100-7, the IEEE 1284 interface device 100-8, and the network device 100-9 to receive the PDL data 1000, and is capable of storing the received PDL data 1000 in the RAM 100-1.

A DSC processing unit 200-1 interprets the PDL data 1000 that has been stored in the RAM 100-1. In particular, the DSC processing unit 200-1 is capable of processing the inquiry command 1000-2 included in the PDL data 1000 according to the DSC standard.

A PDL data interpretation unit 200-2 interprets the PDL data 1000 that has been stored in the RAM 100-1. Further, the PDL data interpretation unit 200-2 is capable of performing PDL interpretation in parallel by executing a plurality of tasks under control of an OS 200-6 to be described below. Furthermore, the PDL data interpretation unit 200-2 is capable of processing the inquiry command that the DSC processing was unable to process as will be described below.

An image generation unit 200-3 uses the processing result acquired by the PDL data interpretation unit 200-2 and the RIP ASIC 100-3 to generate the image formation bitmap data 3000. An engine control unit 200-4 forms the image using the image formation bitmap data 3000 and the electrophotographic engine 100-4.

A job controller 200-5 transmits a process flow of each of the software modules. Further, the job controller 200-5 determines whether single-task processing or multitask processing will be performed, and notifies the PDL data interpretation unit 2002-2 on the determination result, as described below.

The OS 200-6 performs task management of the above-described software module group 200-0, 200-2, 200-3, 200-4, and 200-5. Task management includes at least management of multitask processing described above. In other words, parallel processing of the PDL data interpretation unit 200-2 is realized by the task management function provided by the OS 200-6.

The process performed by the software module group 200-0, 200-2, 200-3, 200-4, and 200-5 is described with reference to FIG. 8.

FIG. 8 is a block diagram illustrating the process performed by the software modules in the image processing apparatus according to the present exemplary embodiment. PDL data interpretation performed in the image processing apparatus illustrated in FIG. 1 is described below. More specifically, the image processing apparatus performs multitask processing or single-task processing according to the set operation mode to interpret the PDL data received from the data processing apparatus (i.e., PC 2500) by bidirectional communication.

Further, the process performed by the DSC processing unit 200-1 in the printer 100 for determining whether the PDL data received by the printer 100 includes inquiry information that requires the image processing apparatus to respond to the data processing apparatus is described below. In other words, the DSC processing unit 200-1 determines whether the PDL data received from the data processing apparatus (i.e., PC 2500) includes the inquiry command 1000-2. According to the present exemplary embodiment, the software module group 200-0, 200-1, 200-2, 200-3, 200-4, and 200-5 described below includes modules operating on the CPU 100-0.

Furthermore, control performed by the job controller 200-5 for switching the operation mode set to the PDL data interpretation unit 200-2 from a multi-mode to a single mode, according to the determination result of the DSC processing unit 200-1, is described below.

Referring to FIG. 8, according to the present exemplary embodiment, the PDL data 1000 is input to the printer 100. The software module group 200-0, 200-1, 200-2, 200-3, 200-4, and 200-5 in the printer 100 then processes the PDL data 1000. As a result, the printer 100 acquires the result 4000 of processing the inquiry command 1000-2 in the PDL data and the image formation bitmap data 3000.

In step S20-1 and S20-2, the DSC processing unit 200-1 and the PDL data interpretation unit 200-2 interpret the PDL data 1000 to acquire the response 4000 with respect to the inquiry command 1000-2.

Further, in step S20-2, the PDL data interpretation unit 200-2 interprets the PDL data 1000 and generates the intermediate data 2000. In step S20-3, the RIP ASIC 100-3 then interprets the intermediate data 2000 under control of the image generation unit 200-3, so that the image formation bitmap data 3000 is generated (i.e., rendered).

The printer 100 uses each of the above-described software modules to perform the image forming process with respect to the PDL data 1000 described below. The printer 1000 thus performs mode switching control according to the present embodiment.

Figure 9A:
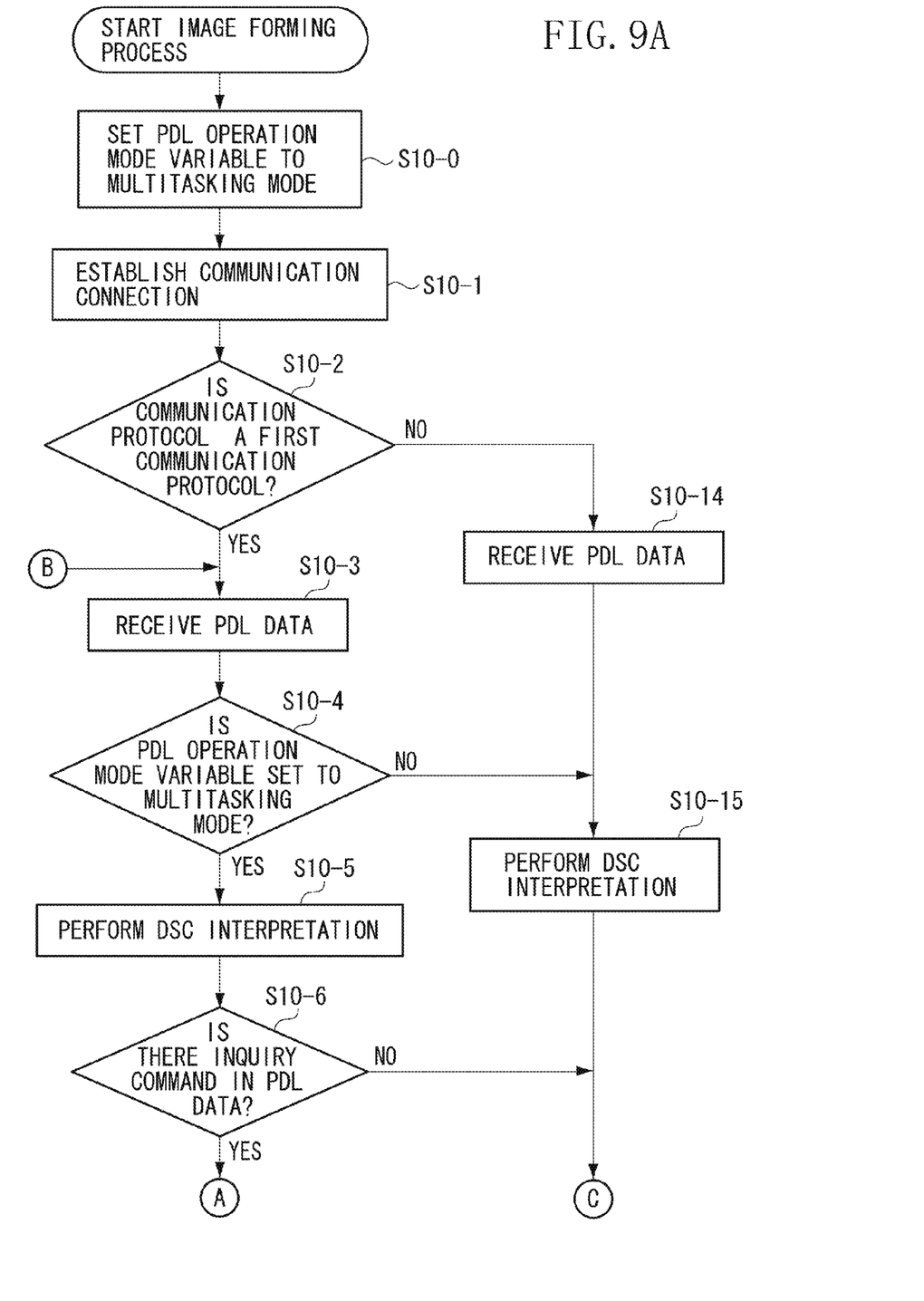
FIG. 9 is a flowchart illustrating a data processing method of the image processing apparatus.
Figure 9B:
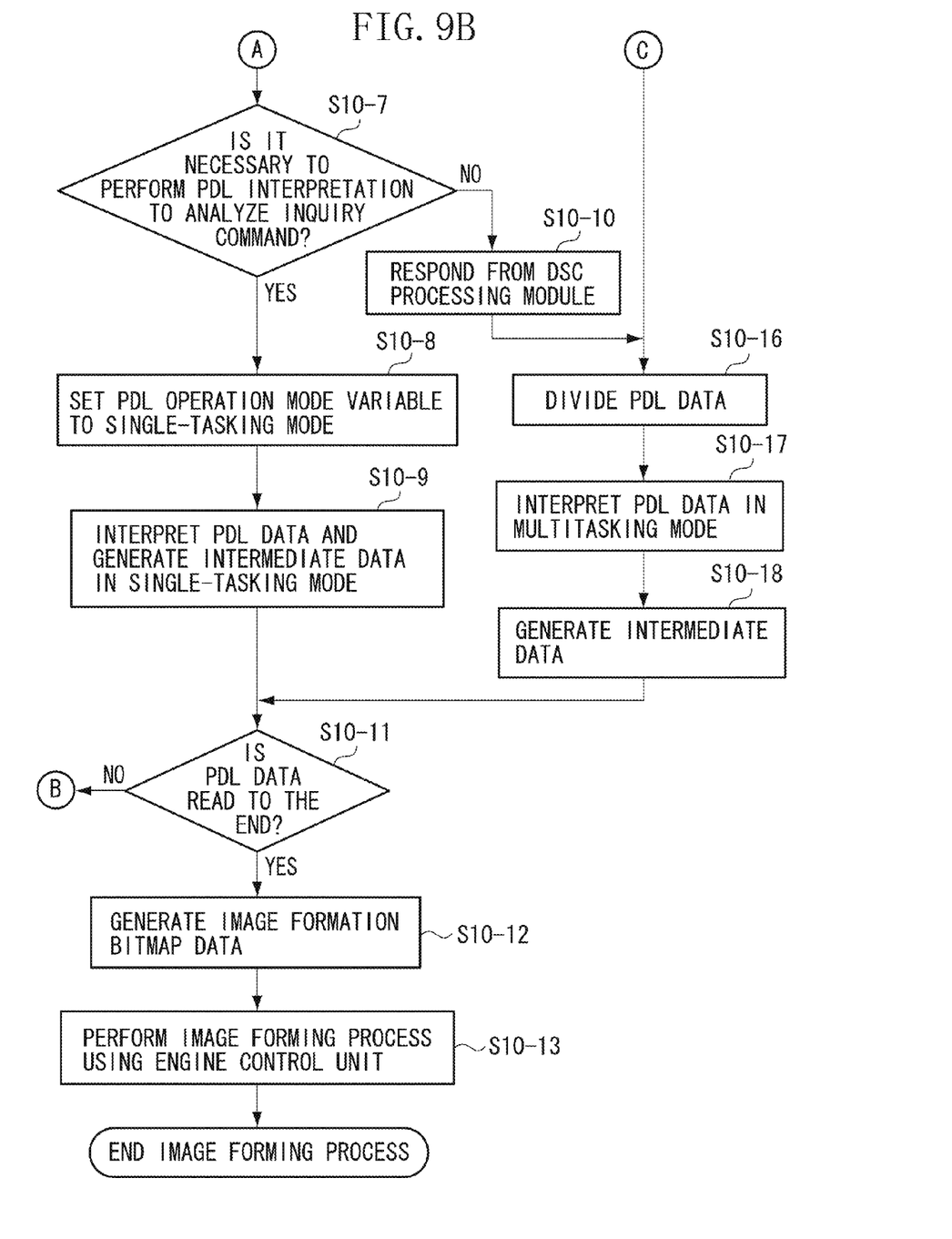

The process performed with respect to the PDL data 1000 using the above-described devices in the printer 100 is described below with reference to FIG. 9. FIG. 9 is a flowchart illustrating the data processing method performed by the image processing apparatus according to the present exemplary embodiment. The process illustrated in the flowchart illustrated in FIG. 9 is realized by the CPU 100-0 loading control programs in the RAM 100-1 to execute them (i.e., each of the software modules illustrated in FIG. 7).

It is assumed that the PDL data interpretation unit 200-2 is capable of interpreting the PDL data received from the PC 2500 based on bidirectional communication by performing multitask processing or single-task processing according to the set operation mode. According to the present exemplary embodiment, the job controller 200-5 can switch the setting of the operation mode between the single-tasking mode and the multitasking mode. Further, the DSC processing unit 200-1 includes a function for determining whether the PDL data received from the PC 2500 includes the response information which requires the printer 100 to respond to the PC 2500. More specifically, the DSC processing unit 200-1 illustrated in FIG. 8 executes, based on the process illustrated in the flowchart described below, a command determination function process for determining whether the PDL data includes a command which requires a response to the PC 2500.

The communication protocol conforming to Apple Talk® will be referred to as a first communication protocol, and the communication protocol conforming to TCP/IP will be referred to as a second communication protocol. The first communication protocol is a standard for transmitting the PDL data that requires a response to the inquiry command, and is a bidirectional type communication protocol. On the other hand, the second communication protocol does not require a response, and is a standard that executes only the commands among the inquiry commands that do not require a response. The second communication protocol is thus a one-way communication protocol. Further, the process of the flowchart illustrated in FIG. 9 is described below based mainly on the software module group 200-0, 200-1, 200-2, 200-3, 200-4, and 200-5 operating on the CPU 100-0.

In step S10-0, the job controller 200-5 sets a variable indicating the PDL operation mode to the multitasking mode. The process is performed by the job controller 200-5 rewriting the variable that indicates the PDL operation mode recorded in the RAM 100-1. According to the present exemplary embodiment, the PDL data interpretation unit 200-2 is initially set to the multitasking mode and thus interprets the PDL data by performing multitask processing. If the variable is set to the single-tasking mode, the PDL data interpretation unit 200-2 interprets the PDL data by performing single-task processing.

If the variable has been set to the multitasking mode, the PDL data interpretation unit 200-2 is executed by two or more tasks under control of the OS 200-6. The PDL data interpretation unit 200-2 then uses the divided PDL data 1000 and interprets the PDL data 1000 in parallel in two or more tasks.

If the variable has been set to the single-tasking mode, the PDL data interpretation unit 200-2 is executed by one task under control of the OS 200-6. The PDL data interpretation unit 200-2 then uses one piece of PDL data 1000 and interprets the PDL data 1000 in one task. In such a case, a stop command is issued to one of the two PDL data interpretation units 200-2 that does not perform the interpretation process. The processes performed in the multitasking mode and the single-tasking mode is also described below in the process flow.

In step S10-1, the communication control unit 200-1 controls the USB interface device 100-7, the IEEE 1284 interface device 100-8, and the network device 100-9 according to communication from the PC 2500. The communication control unit 200-1 thus establishes communication connection with the PC 2500.

In step S10-2, the communication control unit 200-1 determines whether the type of the communication protocol used in the connection established in step S10-1 is the first communication protocol. The communication control unit 200-1 can thus determine whether the connection in which bidirectional communication is necessary has been established.

If the type of the communication protocol is the first communication protocol (YES in step S10-2), the process proceeds to step S10-3. In step S10-3, the job controller 200-5 notifies the PDL data interpretation unit 200-2 to receive the PDL data. On the other hand, if the type of the communication protocol is not the first communication protocol (NO in step S10-2), the process proceeds to step S10-14. In step S10-14 to step S10-18, the job controller 200-5 notifies the DSC processing unit 200-1 and the PDL data interpretation unit 200-2 to generate the intermediate data by performing conventional multitask processing. The determination process is performed based on a technical background as described below.

As described above, bidirectional communication is performed in the first communication protocol. As a result, if the communication protocol is the first communication protocol, the printer 100 may respond to the PC 2500. The present embodiment may also be implemented by adding to the condition in the determination process performed in step S10-2 a determination that the communication protocol is a type other than the first communication protocol. The printer 100 corresponding to communication other than the first communication protocol in which bidirectional communication is necessary can thus be implemented.

If the communication control unit 200-1 determines that the communication protocol is not the first communication protocol (NO in step S10-2), the process proceeds to step S10-14. In step S10-14, the communication control unit 200-1 receives the PDL data 1000 by controlling the USB interface device 100-7, the IEEE 1284 interface device 100-8, or the network device 100-9. The communication control unit 200-1 is then executed by storing the PDL data 1000 in the RAM 100-1.

In step S10-15, the DSC processing unit 200-1 performs DSC interpretation. More specifically, the DSC processing unit 200-1 extracts from the PDL data 1000 stored in the RAM 100-1 the data conforming to the DSC standard. The DSC processing unit 200-1 then processes the above-described inquiry command 1000-2. Since it was determined in step S10-2 that it is not necessary to perform bidirectional communication, the DSC processing unit 200-1 only executes the commands that do not require a response to the host. It is thus unnecessary for the DSC processing unit 200-1 to respond to the host side.

In step S10-16, the job controller 200-5 divides the PDL data 1000. In other words, the job controller 200-5 divides the PDL data 1000 stored in the RAM 100-1 to two or more parts to interpret the PDL data 1000 in multitask processing.

In step S10-17, the PDL data interpretation unit 200-2 operating on the CPU 100-0 performs PDL interpretation employing multitask processing. More specifically, the PDL data interpretation unit 200-2 realized by two or more tasks, reads the divided PDL data 1000 stored in the RAM 100-1. The PDL data interpretation unit 200-2 realized by two or more tasks then performs interpretation with respect to the rendering command 1000-1 and the inquiry command 1000-2 in the PDL data 1000. The job controller 200-5 divides the PDL data 1000 by a page and assigns the pages to be processed according to a load status of each PDL data interpretation unit 200-2.

According to the present exemplary embodiment, the PDL data interpretation unit 200-2 analyzes the command groups according to the PS® standard. Since it has been determined in step S10-2 that it is not necessary to perform bidirectional communication, the PDL data interpretation unit 200-2 only processes the commands that do not require a response to the host side. It is thus unnecessary for the PDL data interpretation unit 200-2 to respond to the host side.

In step S10-18, the PDL data interpretation unit 200-2 generates the intermediate data 2000 using only the rendering command 1000-1 in the interpretation process. The process then proceeds to step S10-11.

If the communication control unit 200-1 determines that the communication protocol is the first communication protocol (YES in step S10-2), the process proceeds to step S10-3. In step S10-3, the communication control unit 200-1 receives the PDL data 1000 by controlling the USB interface device 100-7, the IEEE 1284 interface device 100-8, or the network device 100-9. The communication control unit 2001 stores the PDL data 1000 in the RAM 100-1 to execute step S10-3.

In step S10-4, the job controller 200-5 determines whether the variable of the PDL operation mode is set to the multitasking mode. The process is performed by the CPU 100-0 determining a truth-value of the variable stored in the RAM 100-1.

If the job controller 200-5 determines that the variable of the PDL operation mode is set to the multitasking mode (YES in step S10-4), the process proceeds to step S10-5. In step S10-5, the DSC processing unit 200-1 operating on the CPU 100-0 performs DSC interpretation. In step S10-6, the DSC processing unit 200-1 then determines whether there is an inquiry command in the PDL data 1000.

If the DSC processing unit 200-1 determines that there is an inquiry command in the PDL data 1000 (YES in step S10-6), the process proceeds to step S10-7. In step S10-7, the DSC processing unit 200-1 determines whether it is necessary for the PDL data interpretation unit 200-2 to perform PDL interpretation to analyze the inquiry command.

If the DSC processing unit 200-1 determines that it is necessary for the PDL data interpretation unit 200-2 to perform PDL interpretation to analyze the inquiry command (YES in step S10-7), the process proceeds to step S10-8. In step S10-8, the job controller 200-5 operating on the CPU 100-0 rewrites the PDL operation mode variable to the single-tasking mode. In step S10-9, the job controller 200-5 then instructs the PDL data interpretation unit 200-2 to perform PDL interpretation within one task. Upon receiving the instruction, the PDL data interpretation unit 200-2 analyzes the PDL data within a single task. The PDL data interpretation unit 200-2 then generates the intermediate data 2000 using only the rendering command 1000-1 in the interpretation process.

On the other hand, if the DSC processing unit 200-1 determines that there is no inquiry command in the PDL data 1000 (NO in step S10-6), the process proceeds to step S10-16. In step S10-16, the job controller 200-5 divides the PDL data 1000. Since the subsequent processes performed in step S10-17 and step S10-18 are as described above, further description will be omitted.

If the DSC processing unit 200-1 determines that it is not necessary for the PDL data interpretation unit 200-2 to perform PDL interpretation to analyze the inquiry command (NO in step S10-7), the process proceeds to step S10-10. In step S10-10, the DSC processing unit 200-1 responds to the inquiry command that has become necessary by performing DSC interpretation. In step S10-16, the job controller 200-5 divides the PDL data 1000. Since the subsequent processes performed in step S10-17 and step S10-18 are as described above, further description will be omitted.

If the PDL data has been processed to the end, control is performed to switch the single-tasking mode setting to the multitasking mode. As a result, if the subsequent PDL data do not conform to the PS® standard, the process can be performed at high speed. Further, if the data conforming to the PS® standard is transmitted using the first communication protocol, the process illustrated in the flowchart of FIG. 9 is performed so that appropriate PDL data processing can be executed.

In step S10-11 following step S10-9 and step S10-18, the job controller 200-5 operating on the CPU 100-0 determines whether the PDL data has been read to the end. More specifically, the job controller 200-5 checks whether all PDL data has been read into the RAM 100-1. Further, the job controller 200-5 determines, based on information from the communication control unit 200-0, whether communication connection has been closed. If both are determined to be true, the job controller 200-5 determines that the PDL data has been read to the end.

If the job controller 200-5 determines that the PDL data 1000 has not been read to the end (NO in step S10-11), the process returns to step S10-3, and the process is restarted from inputting of the data. On the other hand, if the job controller 200-5 determines that the PDL data 1000 has been read to the end (YES in step S10-11), the process proceeds to step S10-12.

In step S10-12, the job controller 200-5 instructs the image generation unit 200-3 to generate the image formation bitmap data 3000. More specifically, the RIP ASIC 100-3 generates, under control of the image generation unit 200-3, the image formation bitmap data 3000 using the intermediate data 2000 generated by interpreting the PDL data. Such a process is generally referred to as rendering. The image formation bitmap data 3000 generated by the RIP ASIC 100-3 is then stored in the HDD 100-2.

In step S10-13, the job controller 200-5 issues a command to the engine control unit 200-4 to form the image using the generated image formation bitmap data 3000. The process then ends. In other words, the electrophotographic engine 100-4 uses the image formation bitmap data 3000 to form the visible image on the visible medium 400, such as paper, under control of the engine control unit 200-4.

According to the present exemplary embodiment, the image formation bitmap data is stored in the HDD 100-2. However, the present embodiment can also be implemented if the image formation bitmap data is stored in the RAM 100-1 or other storing devices instead of the HDD 100-2.

As described above, according to the process illustrated in the flowchart of FIG. 9, if it is determined that there is an inquiry command (i.e., step S10-6), and if it is also determined that it is necessary for the PDL data interpretation unit 200-2 to perform PDL interpretation, the following process is performed. The PDL data interpretation unit 200-2 is executed within one task to perform PDL interpretation so that response processing with respect to the inquiry command which is necessary when performing the PDL interpretation is not performed by two tasks. As a result, if the image processing apparatus is to communicate with the PC 2500 using the first communication protocol and is set to the multitasking mode, the communication error does not occur between the PC 2500 when interpreting the PDL data.

Further, according to the present exemplary embodiment, if it is determined that there is an inquiry command (i.e., step S10-6), and if it is also determined that it is necessary for the PDL data interpretation unit 200-2 to perform PDL interpretation, the following process is performed. The PDL data interpretation unit 200-2 is executed within one task to perform PDL interpretation. The process can thus be performed within a single task only in the case where it is necessary for the PDL data interpretation unit 200-2 to respond to the inquiry command which requires a response when performing PDL interpretation. As a result, lowering of performance is prevented, and multitask processing is more efficiently performed.

According to the present exemplary embodiment, the printer is described as an example of the image processing apparatus. However, the image processing apparatus may be an MFP. Further, the PC 2500 may be a server apparatus in a cloud computing environment.

Each of the steps in the embodiments of the present invention may also be realized by executing on a processing apparatus (e.g., a CPU or a processor) in a PC (computer), software (i.e., a program) acquired via a network or various storing media.

The present invention is not limited to the above-described exemplary embodiment, and various modifications (including organized combinations of the exemplary embodiments) may be generated based on the spirit of the invention, which are not to be excluded from the scope of the invention.

According to the present exemplary embodiment, two PDL interpretation units are realized by one CPU. However, two PDL interpretation units may be realized by two CPUs, which is referred to as interpretation using multiple CPUs. In such a case, one PDL interpretation unit is realized on each CPU. The number of CPUs and the number of PDL interpretation units are not limited to the above.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-079422 filed Mar. 31, 2011, which is hereby incorporated by reference herein in its entirety.

What is claimed is:

1. An image processing apparatus comprising:
a receiving unit configured to receive PDL data from a data processing apparatus according to a predetermined protocol;
an interpretation unit configured to interpret PDL data received by the receiving unit by performing multitask processing when a multitasking mode is set, and by performing single-task processing when a single-tasking mode is set;

a determination unit configured to determine whether the predetermined communication protocol is a type of communication protocol that requires a response to an inquiry command; and a control unit configured not to switch, if the determination unit determines that the predetermined communication protocol is not a type that requires a response, a multi-task mode setting, and configured to switch, if the determination unit determines that the predetermined communication protocol is a type that requires a response, a multitasking mode setting on the interpretation unit to a single-tasking mode setting to cause the interpretation unit to interpret PDL data by performing single-task processing.

2. An image processing apparatus capable of performing bidirectional communication with a data processing apparatus, the image processing apparatus comprising:

an interpretation unit configured to interpret PDL data received from the data processing apparatus employing bidirectional communication by performing multitask processing or single-task processing according to an operation mode;

a first determination unit configured to determine whether a communication protocol used in communicating with the data processing apparatus is a type in which response information to inquiry information is to be notified; and a control unit configured to switch the operation mode from a multitasking mode to a single-tasking mode, wherein the control unit switches, if the first determination unit determines that a communication protocol used to communicate with the data processing apparatus is not a type in which response information to inquiry information is to be notified, the operation mode from a multitasking mode to a single-tasking mode.

3. The image processing apparatus according to claim 2, further comprising a second determination unit configured to determine, after the first determination unit has performed determination, whether inquiry information that requires the image processing apparatus to respond to the data processing apparatus is included in the received PDL data, wherein the control unit switches, if the second determination unit determines that the inquiry information is included, an operation mode set to the interpretation unit, from a multitasking mode to a single-tasking mode.

4. The image processing apparatus according to claim 3, wherein the second determination unit determines, before the interpretation unit performs interpretation, whether an instruction which requires the image processing apparatus to respond to the data processing apparatus is included in the inquiry information.

5. The image processing apparatus according to claim 3, wherein the control unit switches, if the second determination unit determines that an instruction which requires the image processing apparatus to respond to the data processing apparatus is not included in the inquiry information, an operation mode set to the interpretation unit, from a multitasking mode to a single-tasking mode.

6. A data processing method of an image processing apparatus comprising:

receiving PDL data from a data processing apparatus according to a predetermined protocol;

interpreting the received PDL data by performing multi-task processing when a multitasking mode is set, and by performing single-task processing when a single-tasking mode is set;

determining whether the predetermined communication protocol is a type of communication protocol that requires a response to an inquiry command; and performing control not to switch, if it is determined that the predetermined communication protocol is not a type that requires a response, a multitask mode setting, and to switch, if the determination unit determines that the predetermined communication protocol is a type that requires a response, a multitasking mode setting of the interpretation process, to a single-tasking mode setting to interpret the PDL data by performing single-task processing.

7. A non-transitory computer-readable storage medium storing a program for causing an image processing apparatus to perform the data processing method according to claim 6.

* * * * *